Sept. 2, 1969     L. M. SHERIDAN     3,464,288

ADJUSTABLE TURN SIGNAL ACTUATOR

Filed May 1, 1968

LESLIE M. SHERIDAN
INVENTOR

BY
BUCKHORN, BLORE, KLARQUIST & SPARKMAN
ATTORNEYS 3,464,288
ADJUSTABLE TURN SIGNAL ACTUATOR
Leslie M. Sheridan, 1300 Chicago St.,
Butte, Mont. 59701
Filed May 1, 1968, Ser. No. 725,883
Int. Cl. G05g 1/04, 5/08
U.S. Cl. 74—525          8 Claims

ABSTRACT OF THE DISCLOSURE

A turn signal actuator apparatus for an automobile is described, including an adjustable actuator arm which may be pivoted and varied in length to compensate for changes in position of an adjustable steering wheel. The actuator arm is formed by a pair of telescoping tubular members, one of which is pivotally attached to a base member which is fastened to the control for the turn signal light switch on the steering column. A spring biased ball detent mechanism is employed to provide the actuator arm with several predetermined pivot positions. This pivoting and telescoping of the actuator arm enables the actuator knob on such arm to be moved to a point adjacent the periphery of the steering wheel in all of the different positions of adjustment of such steering wheel.

Background of the invention

The subject matter of the present invention relates generally to turn signal actuators for transportation vehicles and in particular to a turn signal actuator which is adjustable in length and may be pivoted to several predetermined angles in order to compensate for changes in position of an adjustable steering wheel on such vehicle.

The turn signal apparatus of the present invention is especially useful on automobiles having adjustable steering wheels of the type which may be moved back and forth along the steering column into a plurality of positions at different distances from the dashboard of such automobile. The present turn signal actuator compensates for the steering wheel adjustment, so that the actuator knob is always located adjacent the periphery of such steering wheel and may be operated by the hand of the driver without removing such hand from the steering wheel.

In automobiles having adjustable steering wheels which move back and forth and in some cases tilt up, down, and to the side to compensate for drivers of different height or to enable easier entry and exit from the automobile, it is difficult to reach the turn signal actuator in all positions of the steering wheel because conventional turn signal actuators are fixed in position. Since the turn signal actuator knob is located adjacent the periphery of the steering wheel in only one position of such steering wheel, the driver must take his hand from the wheel to operate the turn signal actuator in any other position of such wheel. This is inconvenient and dangerous because many times when the turn signal actuator is operated the car is in a passing or turning situation requiring both hands of the driver to be on the steering wheel for complete control of the automobile. In order to overcome this problem the adjustable turn signal actuator of the present invention pivots between several different angular positions and is adjustable in length to compensate for the adjustments of the steering wheel. In addition, the present turn signal actuator is simple and inexpensive in construction and is quick and easy to adjust.

It is therefore one object of the present invention to provide an improved turn signal actuator apparatus for a transportation vehicle in which the actuator arm is adjustable in length and may be pivoted into different angular positions.

Another object of the present invention is to provide an adjustable turn signal actuator for an automobile having an adjustable steering wheel, in order to position the actuator knob adjacent the periphery of the steering wheel in a plurality of different positions of such wheel.

A further object of the present invention is to provide an adjustable turn signal actuator arm of simple and inexpensive construction which may be operated quickly and easily.

Brief description of drawings

Additional objects and advantages of the present invention will be apparent from the following detailed description of a preferred embodiment thereof and from the attached drawings of which:

As shown in FIG. 1 an automobile 10 having an adjustable steering wheel 12 is provided with an adjustable turn signal actuator 14 made in accordance with the present invention. The steering wheel 12 is slidably mounted on a steering column 16 for back and forth movement in the direction of arrows 18 toward and away from the dashboard 20 of the automobile. The steering wheel may be locked in any of the three positions shown, respectively, by solid lines, dashed lines, and dash-dot lines. In order to compensate for the different longitudinal positions of the steering wheel, the turn signal actuator 14 is pivoted between the three corresponding positions shown in the direction of arrows 22 and is adjusted in length as indicated by arrows 24.

The steering column 16 may be formed in two sections with the upper section carrying the steering wheel being pivotally attached to a lower steering column section 26 to enable the steering wheel to be tilted up and down or sideways into different angles to accommodate drivers of different height and to enable easier entry and exit from the automobile. These different tilt positions of the steering wheel have not been shown for purposes of clarity. In some cases the turn signal actuator 14 may be mounted on the lower steering column section 26 so that such actuator must also compensate for this tilting of the steering wheel, as well as its longitudinal adjustment. An automatic transmission selector 28 is mounted on the lower steering column section 26.

Figures 2, 3:
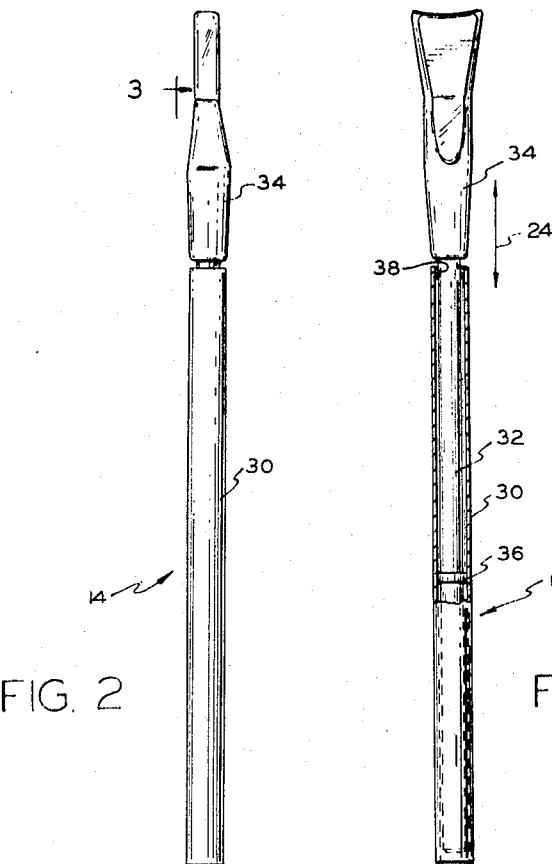
FIG. 2 is a side elevation view of one embodiment of the turn signal actuator of the present invention.
FIG. 3 is a plan view taken along the line 3—3 of FIG. 2 with parts broken away for clarity.
Figure 1:
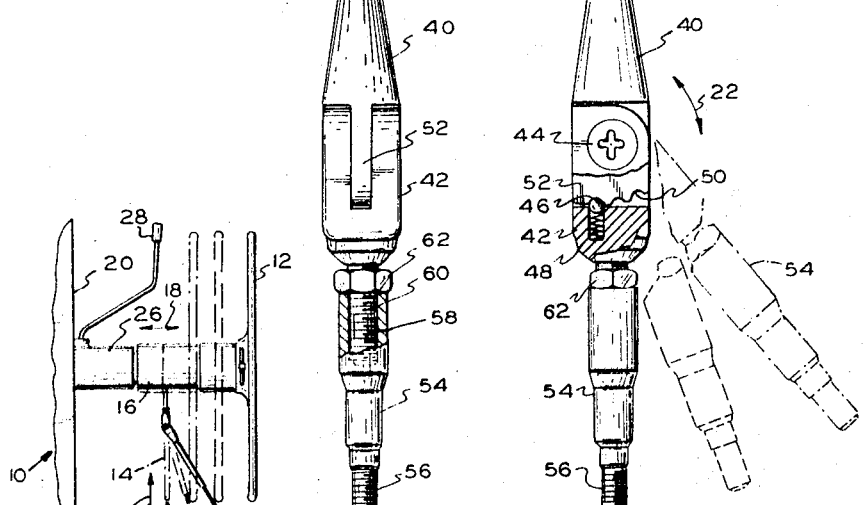
FIG. 1 is a top plan view of a portion of an automobile employing the turn signal actuator arm of the present invention, showing the different positions of such arm and the steering wheel of the automobile.

As shown in FIGS. 2 and 3, the turn signal actuator apparatus 13 includes an actuator arm formed by an outer tubular member 30 and an inner tubular member 32 mounted within such outer member for telescoping movement in the direction of arrows 24 to enable length adjustment of such actuator arm. An actuator knob 34 is attached to the outwardly extending end of the inner tubular member 32 by screw threads or other means. A ring collar 36 may be provided in an annular notch on the inner tubular member 32 to serve as a friction bearing and a stop which engages a ring bushing 38 provided in an annular notch inside the end of the outer tubular member 30 to prevent such inner member from being pulled completely out of the outer member. The other end of the outer tubular member 30 is attached to a connector member 40 by screw threads or the like and such connector member is in turn pivotally attached to a base member 42 by means of a bolt 44 to enable pivotable movement about the axis of such bolt in the direction of arrows 22.

A three-position detent mechanism is employed for the actuator including a detent ball 46 and coil spring 48 provided within a mounting hole in the base member 42. Three detent notches 50 are provided on the end of a tongue portion 52 of the connector member 40 to cause the detent ball 46 to engage such notches and determine the three different pivotal positions of the actuator arm. It should be noted that the right side of the tongue portions 52 in FIG. 3 is foreshortened to enable clearance when it is pivoted with respect to the base member 42 between the positions shown.

An adaptor member 54 may be employed to enable the turn signal actuator of the present invention to be substituted for the conventional actuators previously employed on automobiles. One end of the adaptor member 54 is provided with external threads 56 to match those of such conventional actuators, and is provided with an internally threaded cavity 58 at its other end to enable its attachment to the base member 42 by means of an externally threaded shaft 60 on the end of such base member. A lock nut 62 is provided on the threaded shaft 60 of the base member to lock such base member to the adaptor member 54 and prevent their relative rotation.

It will be obvious to those having ordinary skill in the art that many changes may be made in the details of the above-described preferred embodiment of the present invention. For example, the length adjustment of the actuator arm can be achieved by other means than the telescoping members shown. Also the turn signal actuator can be employed on other transportation vehicles than automobiles. Therefore the scope of the present invention should only be determined by the following claims.

I claim:
1. An adjustable turn signal actuator apparatus, comprising:
a base member adapted to be attached to a turn signal switch control on the steering column of a transportation vehicle having an adjustable steering wheel mounted on said column;
an actuator arm of adjustable length; and
connector means for pivotally connecting one end of the actuator arm to base member to enable pivoting and length adjustment of said arm so that the other end of said arm is positioned adjacent the adjustable steering wheel in several different positions of said steering wheel.

2. An apparatus in accordance with claim 1 in which the actuator arm is formed by a pair of telescoping tubular members.

3. An apparatus in accordance with claim 1 in which the connector means includes a detent means for determining the pivotal positions of the actuator arm.

4. An apparatus in accordance with claim 3 in which the detent means includes a spring biased detent ball provided on the base member and a plurality of detent notches provided on a connector member pivotally attached to said base member.

5. An apparatus in accordance with claim 1 which also includes an adapter means for attaching the base member to said turn signal switch control.

6. An apparatus in accordance with claim 2 in which the telescoping members also rotate with respect to each other and an actuator knob is provided on one end of the inner telescoping member.

7. An apparatus in accordance with claim 1 in which the base member is attached to the steering column of an automobile having an adjustable steering wheel which may be moved longitudinally along said steering column.

8. An apparatus in accordance with claim 7 in which a portion of the steering column pivots to tilt the steering wheel to different angles.

References Cited

UNITED STATES PATENTS

| | | | |
|---|---|---|---|
| 2,641,939 | 6/1953 | McKee | 74—544 XR |
| 2,693,511 | 11/1954 | Daon | 340—73 XR |
| 3,209,092 | 9/1965 | Vitaloni et al. | 200—61.54 XR |
| 3,334,201 | 8/1967 | Mutschler et al. | 200—61.27 |

FRED C. MATTERN, JR., Primary Examiner

F. D. SHOEMAKER, Assistant Examiner

U.S. Cl. X.R.

74—527